(12) United States Patent
Funk

(10) Patent No.: US 9,422,480 B2
(45) Date of Patent: Aug. 23, 2016

(54) MULTIPLE TEMPERATURE CONTROL ZONE PYROLYZER AND METHODS OF USE

(71) Applicant: Kip W Funk, Littleton, CO (US)

(72) Inventor: Kip W Funk, Littleton, CO (US)

( * ) Notice: Subject to any disclaimer, the term of this patent is extended or adjusted under 35 U.S.C. 154(b) by 0 days.

(21) Appl. No.: 14/414,953

(22) PCT Filed: Mar. 7, 2014

(86) PCT No.: PCT/US2014/021773
§ 371 (c)(1),
(2) Date: Jan. 15, 2015

(87) PCT Pub. No.: WO2014/164296
PCT Pub. Date: Oct. 9, 2014

(65) Prior Publication Data
US 2015/0368563 A1    Dec. 24, 2015

Related U.S. Application Data

(60) Provisional application No. 61/775,653, filed on Mar. 10, 2013.

(51) Int. Cl.
| | | |
|---|---|---|
| C10B 7/10 | (2006.01) |
| C10B 47/44 | (2006.01) |
| C10B 53/00 | (2006.01) |
| F23G 5/027 | (2006.01) |
| F23G 5/46 | (2006.01) |
| F23G 5/50 | (2006.01) |

(52) U.S. Cl.
CPC ............... *C10B 47/44* (2013.01); *C10B 53/00* (2013.01); *F23G 5/0276* (2013.01); *F23G 5/46* (2013.01); *F23G 5/50* (2013.01); *F23G 2201/303* (2013.01); *F23G 2201/80* (2013.01); *F23G 2206/203* (2013.01); *F23G 2207/101* (2013.01); *F23G 2209/26* (2013.01);

(Continued)

(58) Field of Classification Search
CPC ........... C10B 7/10; C10B 47/44; C10B 1/06; C10B 53/00; C10J 3/007; F23G 5/0273; F23G 5/0276; F23G 5/46; F23G 5/50
USPC ................ 202/117, 118, 137, 145, 151, 223; 201/32, 33
See application file for complete search history.

(56) References Cited

U.S. PATENT DOCUMENTS 1,237,094 A * 8/1917 Prioleau ................... C10B 7/10
                                                                202/118
1,413,838 A * 4/1922 Eddison et al. .......... C10B 7/02
                                                                202/118

(Continued)

FOREIGN PATENT DOCUMENTS

| EP | 2135922 | 12/2009 |
| EP | 2537814 | 11/2012 |

(Continued)

*Primary Examiner* — Jill Warden
*Assistant Examiner* — Joye L Woodard
(74) *Attorney, Agent, or Firm* — Leyendecker & Lemire, LLC

(57) ABSTRACT

A pyrolyzer capable of generating synthesis gas from carbon-based feedstock comprises an oven including an oven shell defining an interior and at least one conveyor configured to move the feedstock through the interior from a feed inlet to a discharge outlet. An outer shell surrounds the oven shell defines a space between the oven shell and the outer shell and a plurality of longitudinally extending dividers are connected to the outer shell and span to the oven shell within the space so as to define multiple temperature control zones therein where each temperature control zone includes one or more heaters.

34 Claims, 15 Drawing Sheets

(52) U.S. Cl.
CPC .............. *F23G 2209/281* (2013.01); *F23M 2900/05004* (2013.01); *Y02E 20/12* (2013.01); *Y02P 20/129* (2015.11)

(56) References Cited

U.S. PATENT DOCUMENTS 5,224,432 A * 7/1993 Milsap, III .............. C10B 47/44
110/229

6,221,329 B1 4/2001 Faulkner
8,304,590 B2 11/2012 Hopkins
2007/0186829 A1 * 8/2007 Cole ...................... C10B 47/44
110/229

FOREIGN PATENT DOCUMENTS

KR 10-1066623 9/2011
KR 10-1207598 12/2012

* cited by examiner

MULTIPLE TEMPERATURE CONTROL ZONE PYROLYZER AND METHODS OF USE

CROSS-REFERENCE TO RELATED APPLICATIONS

This application is claims priority to U.S. Provisional Patent Application No. 61/775,653 filed on Mar. 10, 2013 and having the same inventor and title as the present application of which the full disclosure is incorporated herein.

FIELD OF THE INVENTION

The present invention relates generally to pyrolysis.

BACKGROUND

Pyrolysis comprises the thermal treatment of carbon-based material, or feedstock, in a low or no oxygen environment to chemically modify the material to produce a combustible gas often referred to as synthetic gas or syngas. The solid material remaining after the synthesis typically comprises char or ash. The synthetic gas can be used as fuel in a manner similar to natural gas.

Feedstock can comprise solid fuel, such as coal and waste coal, and/or carbon-waste products, such as but not limited to used tires, biomass, municipal solid waste, and auto shredder residue. The resulting char or ash predominantly ideally comprises chemically inert carbon having a fractional volume of the feedstock from which it results.

Pyrolyzers as the name suggests are devices that perform the act of pyrolysis. In at least some applications, pyrolyzers are utilized as part of a system that both treats waste and generates electricity through the use of gas fired steam boilers and an associated generator.

DETAILED DESCRIPTION

Figure 1A:
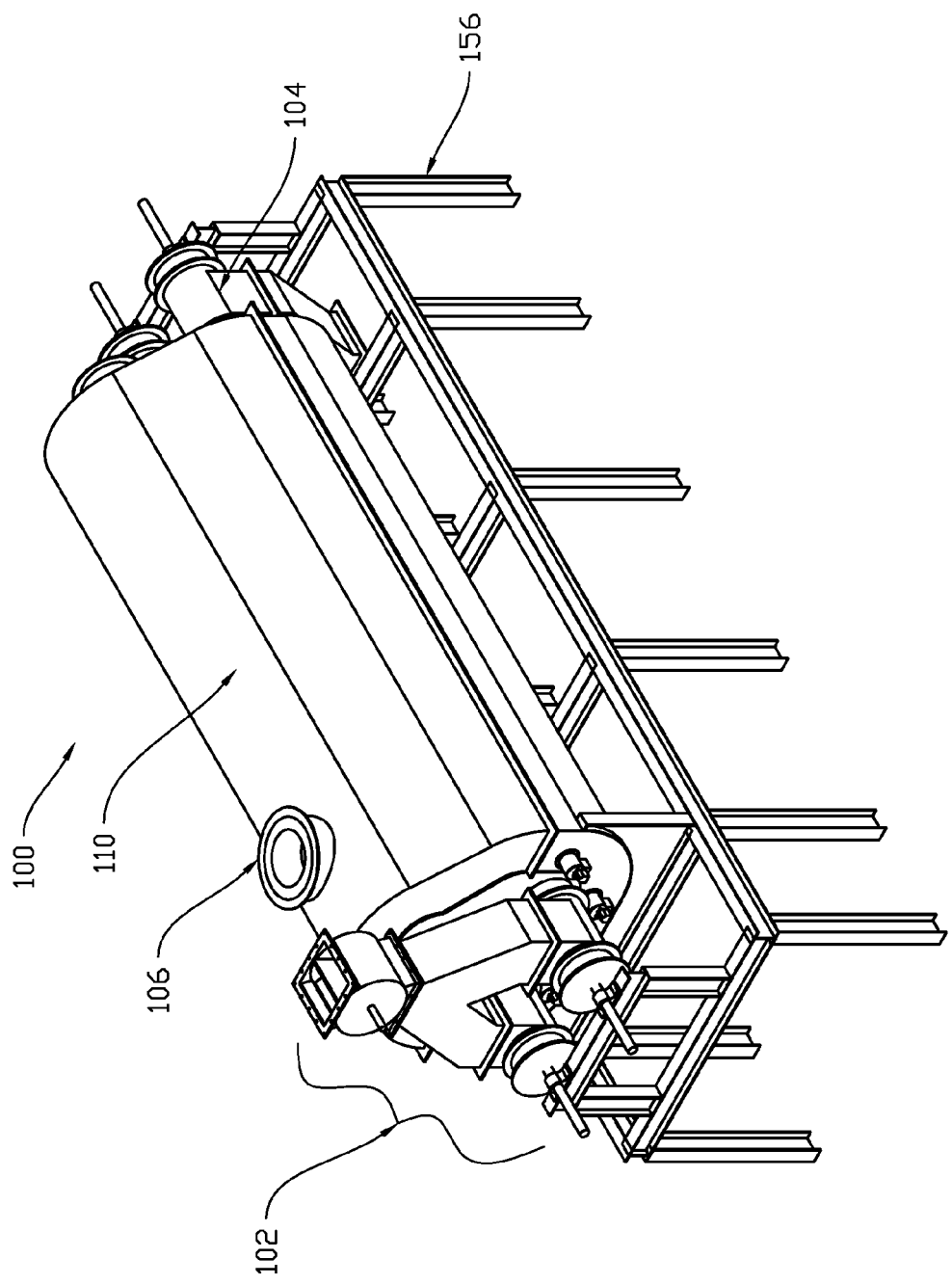
FIGS. 1a & 1b comprise isometric views of a pryrolyzer taken from a generally front and a generally rear view respectively according to an embodiment of the present invention.
Figure 1B:
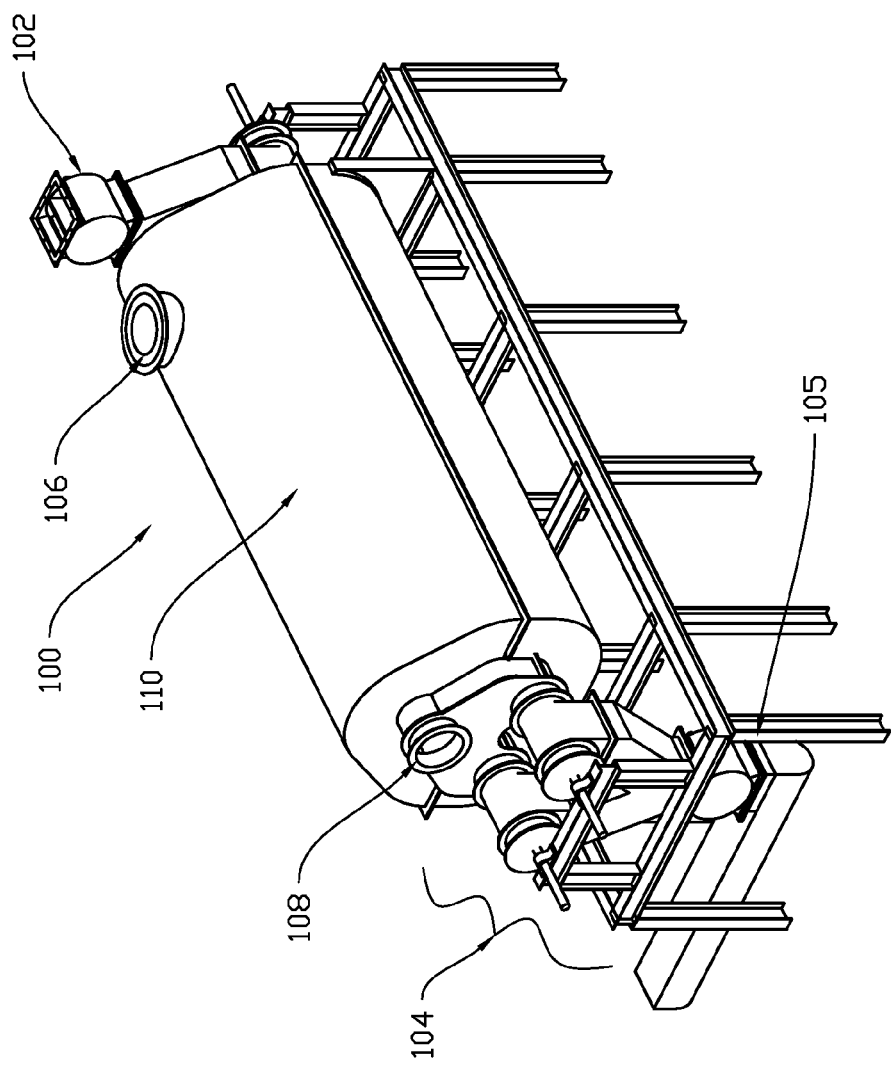

Embodiments of a continuous-feed pyrolyzer for converting waste material (feedstock) into ash or char and a combustible gas (syngas) is described. The pyrolyzer can be integrated with subsystems that make use of the syngas to generate energy. In operation, the pyrolytic thermal converter processes the waste through indirect heating of the retort oven.

Some embodiments of the present invention comprise pyrolyzers having multiple burners segmented into multiple thermal zones with each of the burners in each zone being independently controllable relative to burners in other zones. Advantageously, the pyrolyzer can be controlled and varied in such a manner as to maximize the complete transformation of feedstock as it progresses along either conveyor cradle with the burners in the various zones being activated to maintain an optimum temperature throughout the device minimizing the number of cold or hot spots with the oven. The use of multiple temperature control zones can result in faster, more efficient or more complete production of synthesis gas from the feedstock compared to prior art methods or devices. More efficient production of synthesis gas typically means more gas produced per unit of energy, or per unit of feedstock.

In one embodiment, five distinct thermal zones are provided with each thermal zone having its own burner. The zones converge at the end of the pyrolyzer with the heated gas being circulated over the top of the oven within the outer shell before being exhausted from the device.

In other embodiments of the pyrolyzer, the oven shell is comprised of separate and distinct sections made of a high temperature alloy and welded and/or bolted together to form the finished vessel. Unlike traditional cast ovens, the configuration of the oven permits sections to be replaced without having to replace the entire oven. For instance, the cradle section in which the feedstock is moved along the pyrolyzer by the rotating conveyor shafts tend to wear more quickly than the oven's top section, which does not come into contact with moving parts during operation. Replacement of just the worn cradles can be significantly less expensive than the complete replacement of a cast oven.

In yet other embodiments of the pyrolyzer, an outer shell is provided having inner and outer walls that sandwich a tubes through which water is circulated for the purpose of absorbing heat energy that would otherwise be radiated to the atmosphere surrounding the pyrolyzer. In one application, the water can be circulating condensate from a steam boiler wherein the water is preheated as it passes through the outer shell water jacket. In another variation, the water can be make up water for the boiler that is also preheated prior to introduction into the closed system of the steam boiler.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The terms "removable", "removably coupled", "removably installed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," bottom," "front," "back," "above," "beneath," and "below," as used in this specification and appended claims, refer to relative positions of identified elements, components, or objects, where the components or objects are oriented in an upright position as normally installed or used.

A Method of Generating Power Using Embodiments of a Pyrolyzer

FIGS. 1a&b illustrate an embodiment of a pyrolyzer 100. As viewed externally, the pyrolyzer includes a rotary airlock feeder assembly 102, a rotary discharge airlock assembly 104 optionally including char quenching apparatus 105, a waste heat exhaust removal port 106, and a syngas discharge port 108. The feedstock enters the device through the airlock feeder and is thermally converted to syngas, char and ash therein with the syngas being drawn off through the syngas discharge port and the char and ash being removed from the pyrolyzer through the discharge air lock. The heated combustion gases which are used to heat the feedstock are exhausted through the waste heat removal port. The internal configuration of the pyrolyzer and its internal operation are discussed in greater detail herein.

Figure 2:
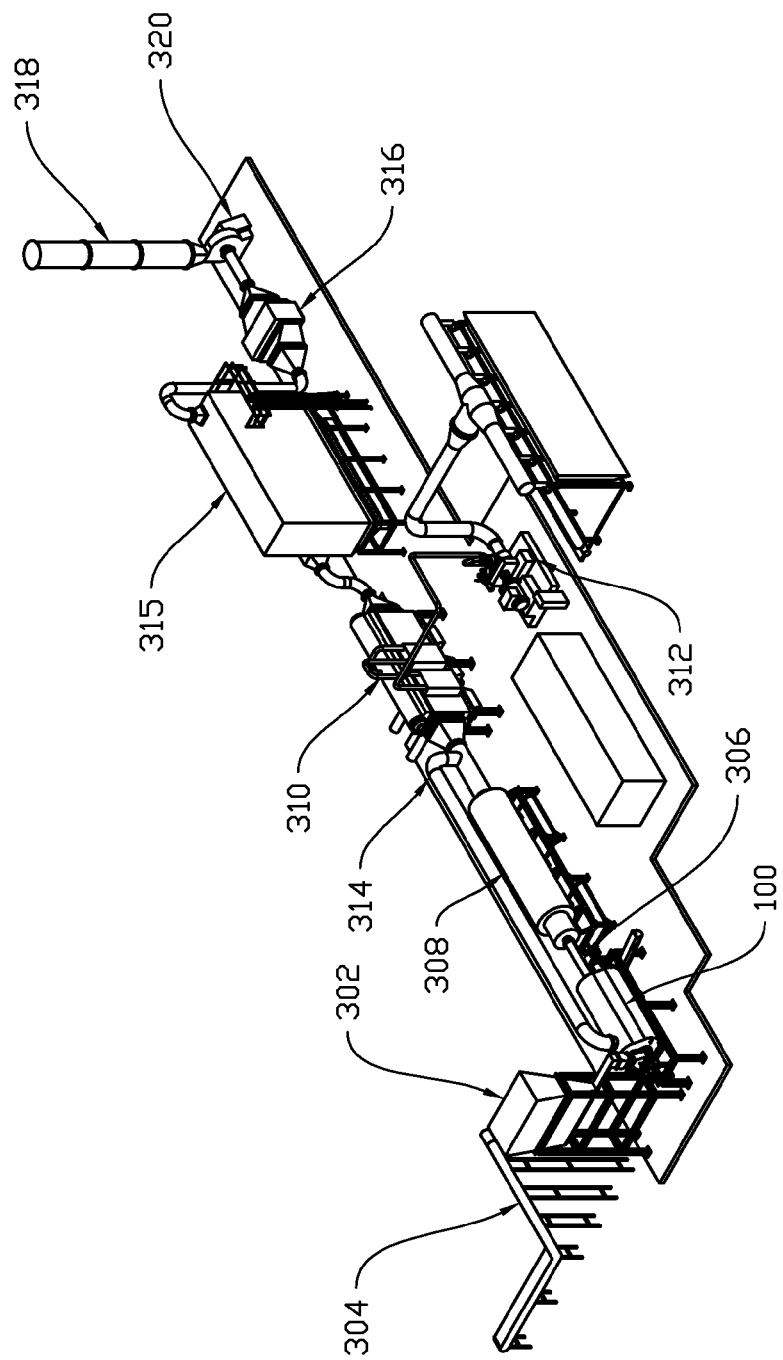
FIG. 2 is an isometric view of a power plant for generating electrical power using feedstock as fuel incorporating an embodiment of the pryrolyzer.

As indicated above, a pyrolyzer can be used in conjunction with a steam power plant to generate electricity using the syngas as its primary combustible. A typical power plant incorporating embodiments of the pyrolyzer is illustrated in FIG. 2. The operation of the power plant to generate power using waste material feedstock and to volumetrically reduce the solids is represented in the flow chart/block diagram of FIG. 3 and is described herein.

Figure 3:
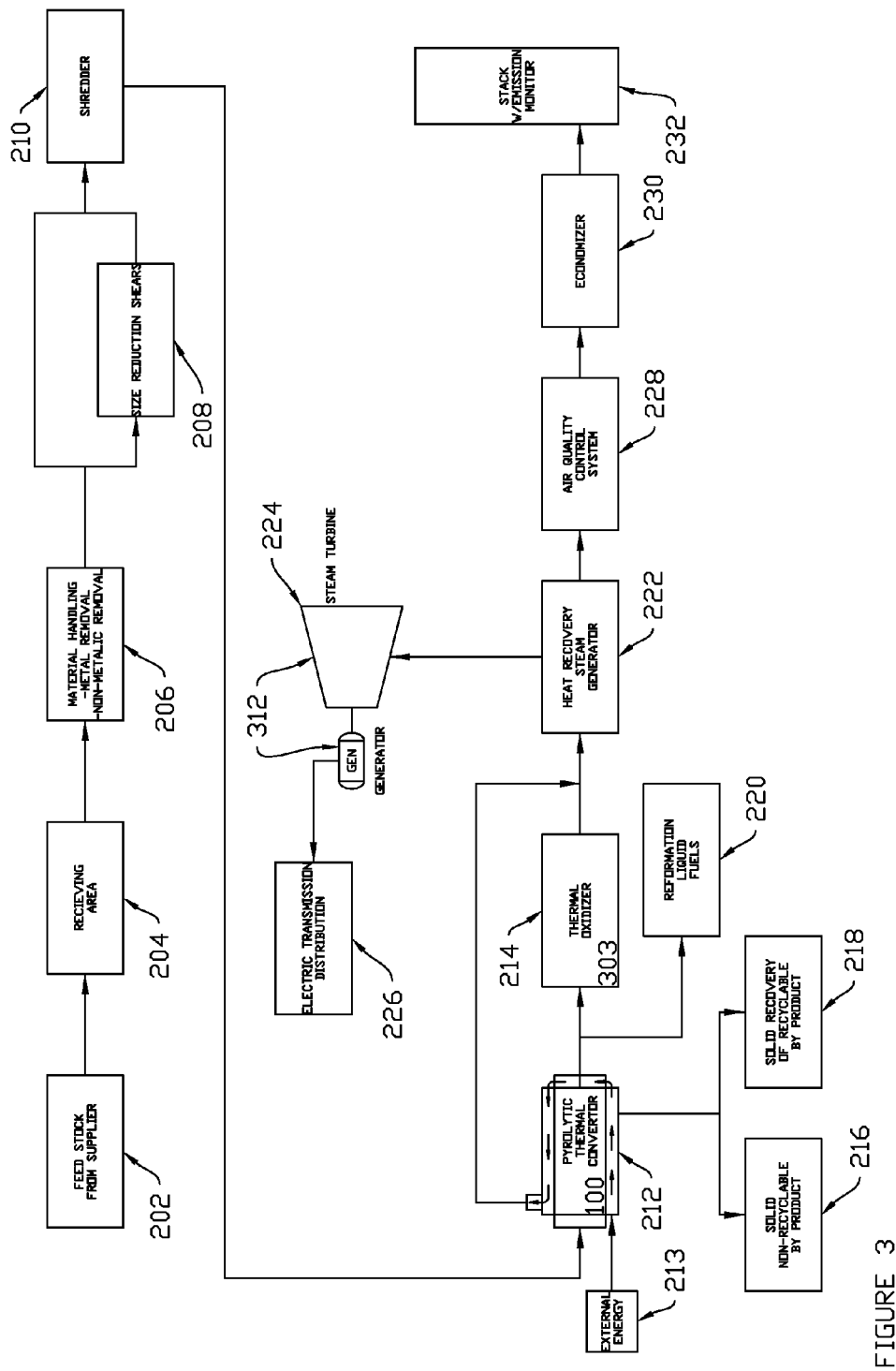
FIG. 3 is a block diagram/flow chart illustrating operation of the power plant of FIG. 2 according to an embodiment of the present invention.

Referring to FIG. 3 with reference to FIG. 2 as appropriate, as indicated in blocks 202 & 204 suitable feedstock is obtained from a supplier and delivered to a suitable receiving area. Suitable feedstock consists materials having a significant carbon content including but not limited to waste coal, municipal waste, construction debris, waste oils, sludge, tires, and auto shredder residue.

As indicated in blocks 206-210, the feedstock material is prepared for transformation in the pyrolyzer. Magnets, eddy current magnets and other known means are used to remove metallic materials from the feedstock. The remaining material is chopped, cut and shredded to reduce it to a size usable by the pyrolyzer. The prepared feedstock is then deposited in a hopper 302 by a suitable conveying system 304 for imminent use.

As indicated block 212, the prepared feedstock is fed into the pyrolyzer 100. Typically, the burners are fed by a combustible fuel. In some circumstances the fuel can be a portion of the syngas created in the process, but in other instances the combustible is from an external source (block 213) and may be, for example, propane or natural gas.

The pyrolyzer 100 operates by introducing the feedstock into the front of the system through the airlock feeder assembly 102 and into an inner cavity or oven (described in the following section), while circulating high temperature gas created by the combustion of the combustible fuel in the space between the outer shell and the walls of the oven. Heat transfer occurs through the walls of the oven without direct combustion of the feedstock occurring as the environment within the oven is nearly oxygen free. A temperature of about 1400° F. to 1900° F. is maintained within the oven. The feedstock is typically broken down thermally and mechanically until substantial conversion of carbon and hydrogen is achieved. Carbon, oxygen and hydrogen molecules or atoms typically reform into a syngas, which is exhausted from the back of the oven through transport duct 306 into thermal oxidizer 308.

Referring to block 214, the syngas is introduced into a thermal oxidizer 308 at an average temperature of about 1600° F. The thermal oxidizer also draws ambient air into it in a controlled manner. The oxygen in the ambient air facilities combustion of the superheated syngas. Additional external burners may also be utilized in the thermal oxidizer to maintain a minimum desirable flow of heated exhaust.

As indicated in blocks 216 & 218, the char and ash byproducts of the feedstock conversion are ejected out of the pyrolyzer through the discharge airlock assembly 104. The transport screw equipped with a mist spray quench 105 may also be provided downstream of the airlock to dowse the char and ash with water to cool them from about 1500-200 degrees F. to about 140 degrees F. The char and ash is separated into recyclable and non-recyclable components. Recyclable components may include metals, such as steel belt material encapsulated in ground tires.

Referring to block 220, some of the syngas may be optionally diverted from entering the thermal oxidizer through a tee in the transport duct and reformed into a liquid fuel. The liquid fuel can be used for any suitable purpose including providing the external energy necessary to fuel the burners in the pyrolyzer and/or the auxiliary burners in the thermal oxidizer.

As indicated in block 222, the heated exhaust exits the thermal oxidizer and is drawn into the steam generator 310 where the exhaust's heat is transferred to water to generate high pressure, high temperature steam. To further improve the efficiency of the system, an exhaust pipe 314 off of the pryrolyzer's heat removal port 106 carries the high temperature exhaust to the oxidizer as well to assist in the steam generation process.

Steam from the heat recovery steam generator is transported to a steam turbine generator 312 as shown in block 224, which converts mechanical energy into electricity. The electricity is ultimately distributed to transmission and distribution systems as indicated in block 226.

Lower grade waste heat exhaust exits the heat recovery steam generator 310 through provided ductwork through an air quality control system 315 as indicated in block 228. The combustion gasses are cleaned to reduce nitrous oxides, acid gasses, air toxics, heavy metals, and particulate, which became entrained within the syngas, generated at the thermal oxidizer 308. The waste heat exhaust stream then is ducted through an economizer 316 as shown in block 230 as an additional efficiency measure to capture more of the low grade waste heat before it is vented to atmosphere through a vertical stack 318 as indicated in block 232. As applicable, the exhaust gasses are monitored for environmental compliance to the operation permits. It is to be appreciated that the syngas through to the associated waste heat exhaust stream is drawn through the system by way of an air transport apparatus 320 typically located proximate the vertical stack.

An Embodiment of a Pyrolyzer

In addition to FIGS. 1a & b, FIGS. 4-18 illustrate the various components comprising an embodiment of a pyrolyzer 100. As mentioned above, the pyrolyzer comprises: (ii) an inner oven 112 (see FIGS. 7 & 8) forming a substantially oxygen-free chamber with rotary conveyers 114 (see FIGS. 4 & 15) to move feedstock therethrough; (ii) an outer shell 110 that forms a multi-zone and multi-burner heated cavity between it and the walls of the oven; (iii) an airlock feeder assembly 102 to introduce feedstock into the oven; (iv) an airlock discharge assembly 104 to remove converted char and ash from the end of the oven; (v) a syngas discharge port 108; and a waste heat exhaust port 106.

Figure 4:
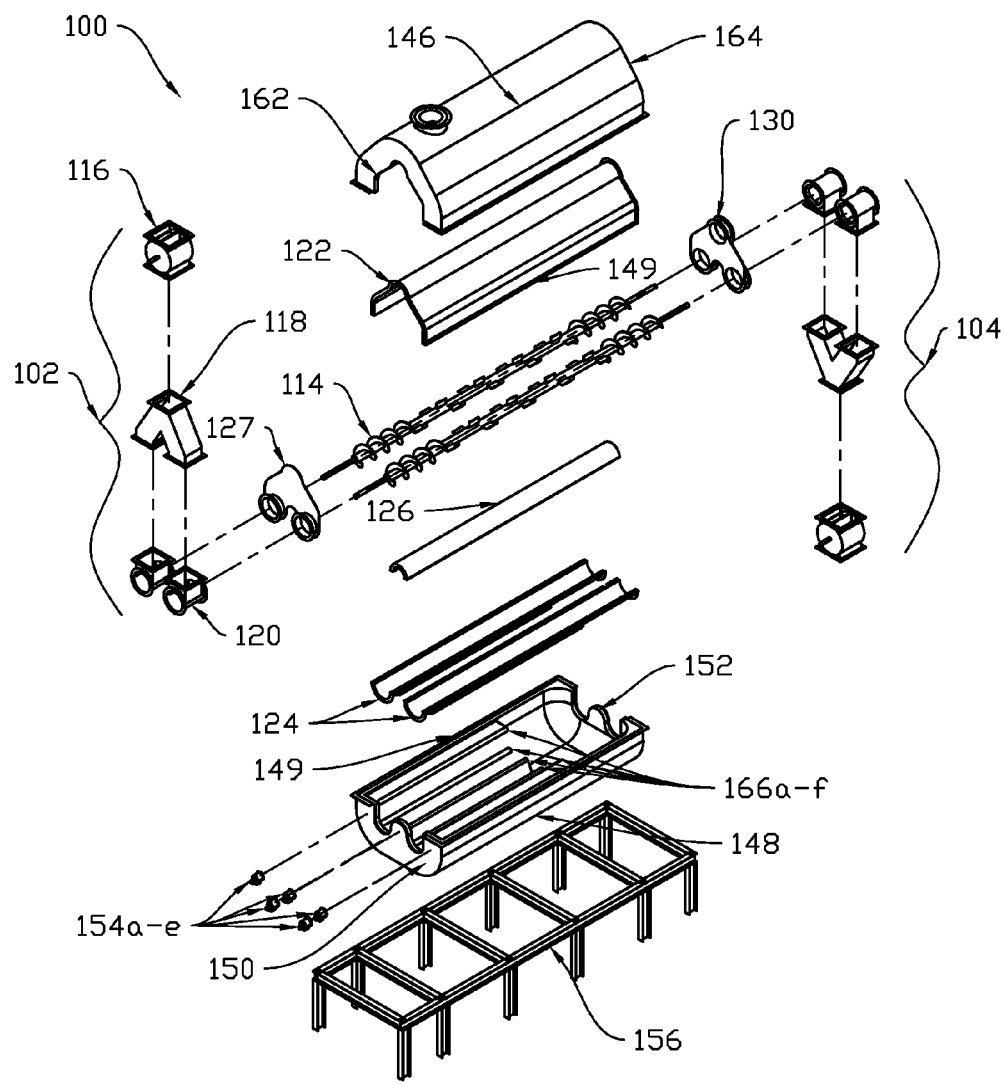
FIG. 4 is exploded isometric view of the pryrolyzer according to an embodiment of the present invention.
Figure 5:
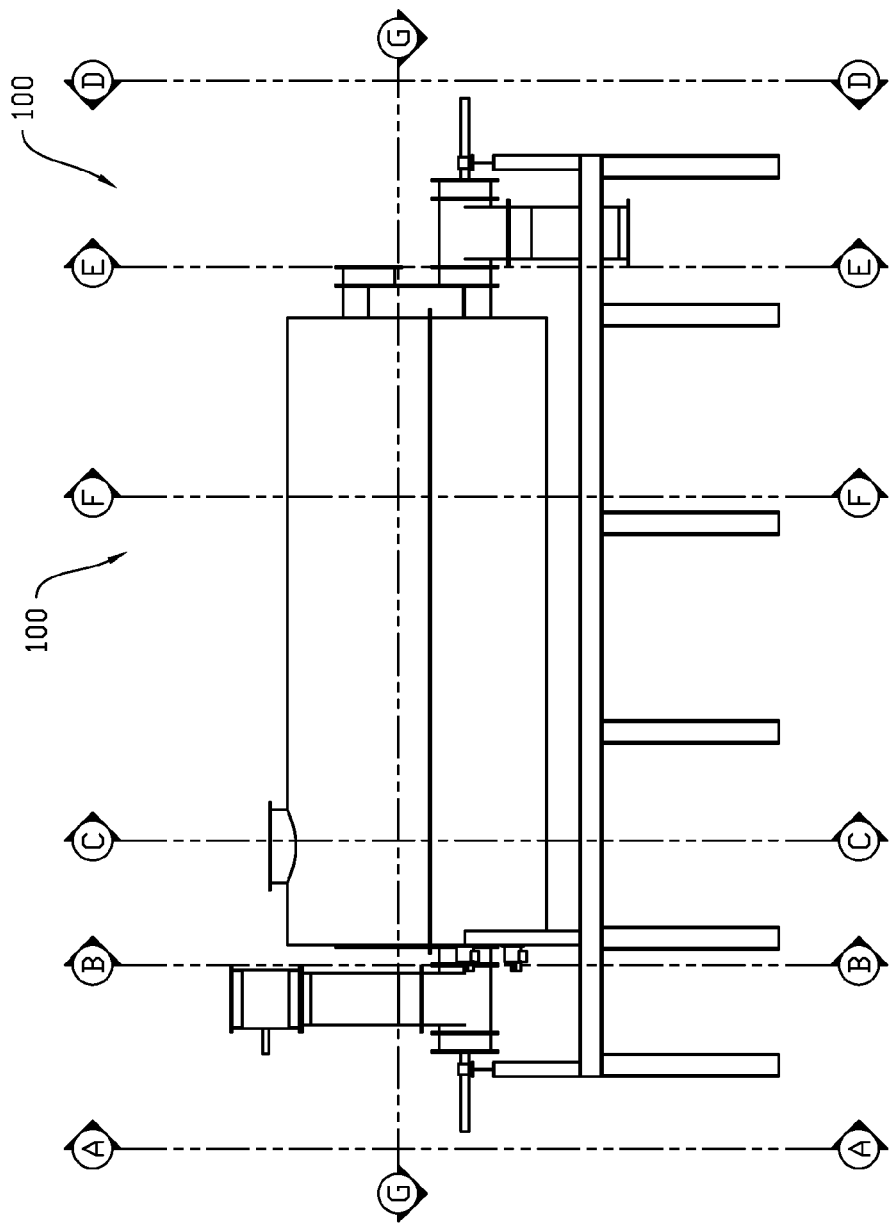
FIG. 5 is a side view of the pyrolyzer according to an embodiment of the present invention.
Figures 6, 7:
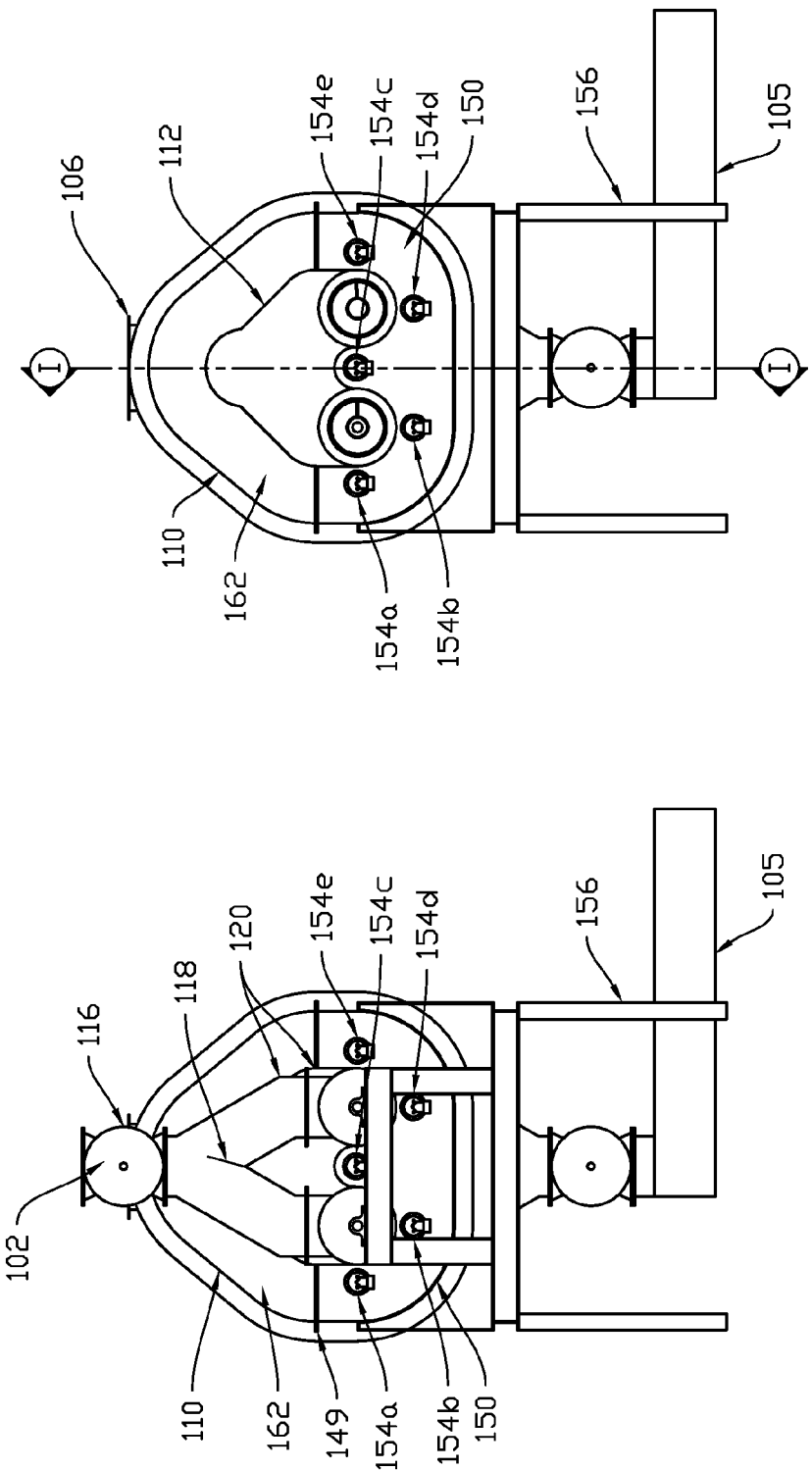
FIG. 6 is a front end view of the pyrolyzer as viewed from perspective A-A of FIG. 5 according to an embodiment of the present invention.
FIG. 7 is a section view of the pyrolyzer taken along lines B-B of FIG. 5 according to an embodiment of the present invention.
Figure 9:
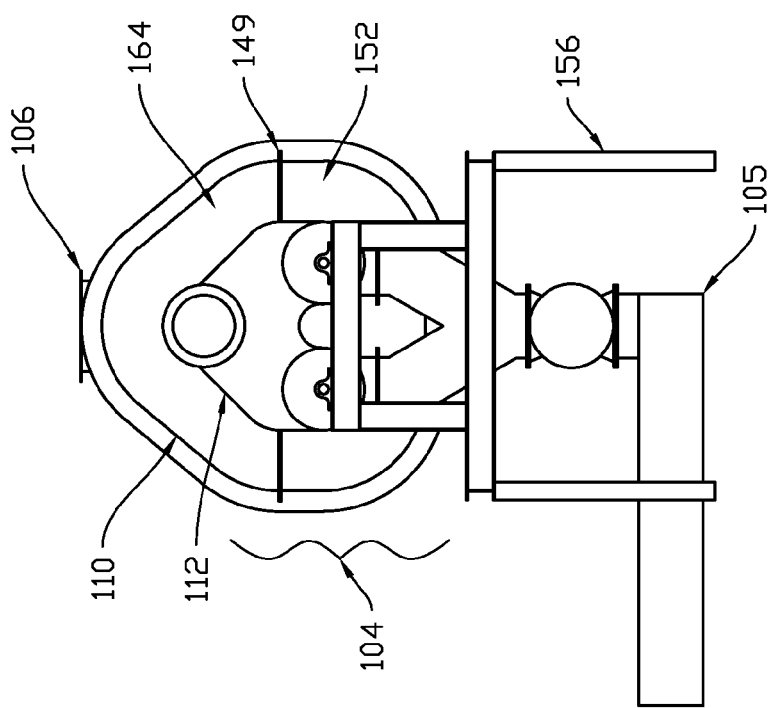
FIG. 9 is a section view of the pyrolyzer taken along lines D-D of FIG. 5 according to an embodiment of the present invention.

Operationally, prepared feedstock is fed into the oven 112 of the pyrolyzer 100 through the airlock feeder 102. Referring to FIGS. 4 & 6, the airlock feeder comprises a rotary airlock 116 that delivers the feedstock to oven and the rotary conveyers operating therein by way of a flop gate 118 and associated manifolds 120. The airlock prevents the free flow of oxygen containing air into the oven permitting a substantially oxygen free environment to be maintained in the oven.

The inner oven comprises a plurality of formed high temperature alloy sections that are joined by welding or mechanical means to form the oven shell. A cross section of the assembled oven shell has a generally triangular three-leaf clover shape as best seen in the cross section of FIG. 8. The components forming the shell are best shown in FIG. 4 and comprise: (i) an elongated upper half 122; (ii) a elongated bottom half comprising two elongated cradle sections 124 in which the feedstock resides and is advanced by the rotary conveyers 114, and an arcuate elongated section 126 for joining the cradle sections; and (iii) respective front and back ends 127 & 129.

The arcuate semicircular shape of the top portion of the upper half 122 is adapted to receive the syngas as it rises from the decomposing feedstock below. The syngas is then pulled along the oven and out of the oven at the syngas discharge port 108 located in the back end 129 by way of a vacuum created by the air transport device 320. The arcuate side portions of the upper half are curved inwardly to direct the syngas to the top portion. Typically the upper half is fabricated of a single sheet of high temperature alloy although variations are contemplated wherein the upper half is comprised of several sections joined together, such as by welding.

Referring to FIG. 4, the bottom half of the oven comprises two cradle sections 124 spaced apart and joined by an arcuate center section 126. As indicated above, the rotary conveyers reside and operate in the concave inwardly facing arcuate surfaces of the cradle sections wherein the feedstock is fed from the front end of the oven to its back end. Cross sections of the respective cradle and center sections are provided in FIGS. 15 & 16 respectively. Of important note the downwardly facing surfaces of the respective sections 124 & 126 include a plurality of longitudinally extending ribs 128 & 130 attached thereto. The ribs act to facilitate the rapid transfer of heat generated by burners located in adjacent heating zones into the oven and the feedstock.

In some embodiments, the various sections of the oven are comprised of both Haynes® HR-160® and 230® high temperature alloys produced by Haynes International of Kokomo, Ind. or equivalent alloys. The HR-160® alloy is covered under ASME Vessel Code case No. 2162 for Section VIII Division 1 construction to 1500° F. (816° C.) and is used for the portions of any section of the oven that come in direct contact with the syngas. The 230® alloy is covered under ASME Section VII, Division 1 specification and is used in all other portions of the various sections that do not come into contact with the syngas including flanges, and longitudinally extending ribs.

The sectional construction of the oven instead of cast construction as it typical in the art facilitates the selective replacement of sections rather than the entire device when a section is damaged or more likely wears out. Of significance, on the cradle sections experience frictional wear from both the movement of the feedstock but also the constantly rotating conveyers. Overtime, these sections wear and require replacement. When utilizing the current embodiment oven, the worn cradle sections can be removed from the remainder of the over and new sections can be bolted or welded in their place.

Figure 15:
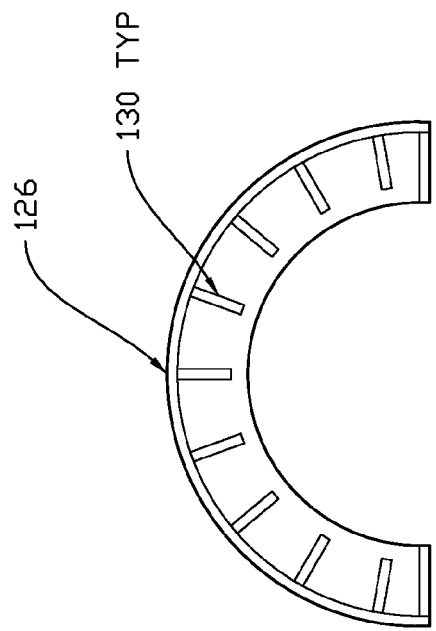
FIG. 15 is an end view of the elongated arcuate section of the oven, which joins the two cradle sections according to an embodiment of the present invention.
Figure 14:
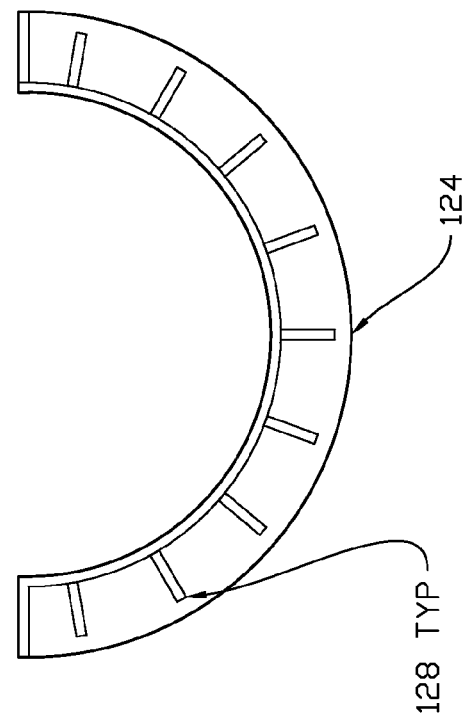
FIG. 14 is an end view of one of the two the conveyor cradle sections of the oven according to an embodiment of the present invention.
Figure 16:
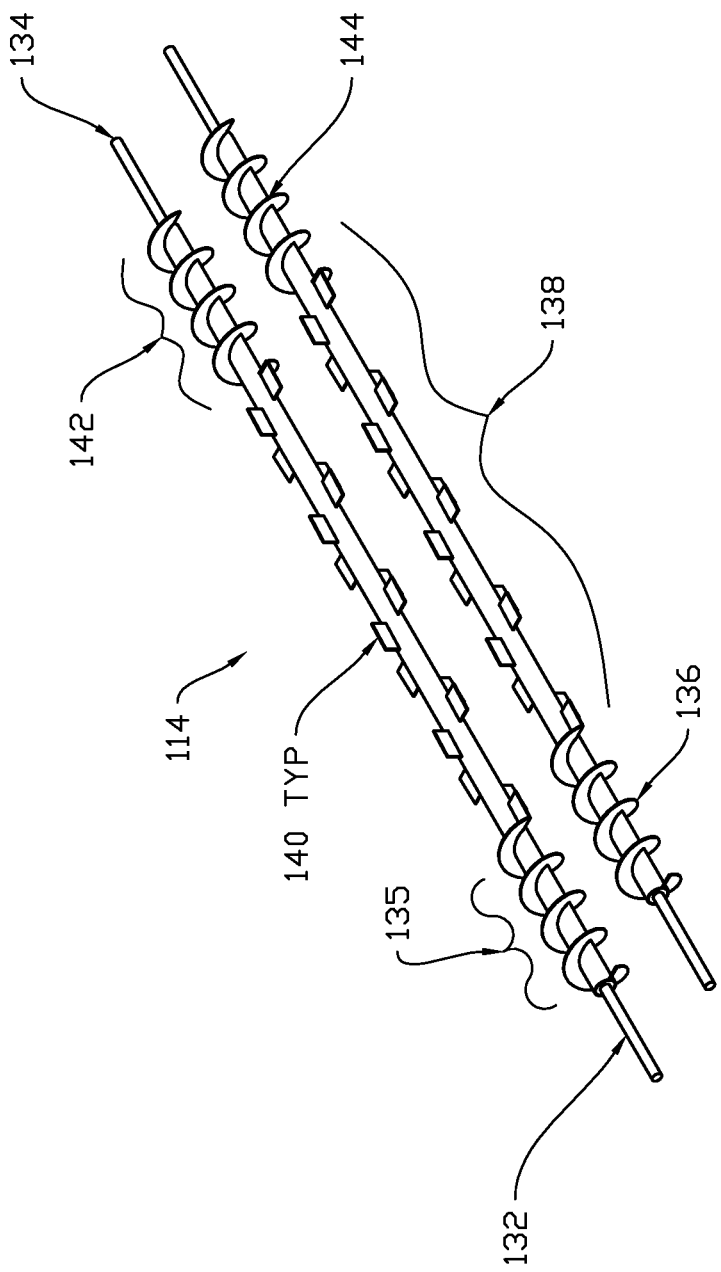
FIG. 16 is an isometric view of the pair of material transport conveyors according to an embodiment of the present invention.

A pair of typical rotary conveyors are illustrated in both FIGS. 4 & 15. The rotary conveyor comprises an elongated shaft comprising several distinct sections. The front and rear end sections 132 & 134 are substantially cylindrical and configured to receive bearing assemblies over them to support the conveyor in a position just above the inside surface of the cradle. The front end is also coupled to a drive motor (not shown) to facilitate rotation and operation of the conveyor. Next to the front end section, an intake section 135 is provided comprising a helical fin 136 that extends from the surface of the conveyor. The intake section is located within an airlock feeder manifold 120. The diameter of the manifold combined with the height of the fin effectively defines the depth of the feedstock. The fin draws and moves the feedstock from the airlock feeder 102 into the oven 112.

The majority of the conveyors length comprises a decomposition section 138 that comprise a plurality of distinct fins 140 that extend radially from the conveyor. The fins act to mechanically breakdown the decomposing feedstock to facilitate a more efficient and complete conversion of the material. The fins are further positioned such that their flat surfaces form a shallow acute angle (preferably less than 30 degrees and more preferably less than 15 degrees) relative to the longitudinal axis of the conveyor. This fin orientation acts to advance the feedstock from the front to the back of the oven.

A discharge section 142 follows the decomposition section and is substantially similar to the intake section comprising a helical fin 144. The helical fin pulls the char and ash solids from the oven where it is dropped into the airlock discharge assembly 104 to exit the pyrolyzer 100.

As indicated above the illustrated pyrolyzer 100 uses two rotary conveyors 114 that are each fed feedstock from the airlock feeder assembly 102 by way of a pant leg chute 118. A diverter gate is typically provided in the chute permitting the feedstock to be dispensed to both conveyors 114 or one or the other. The diverter gate permits continuous feed operation even if one of the two conveyors is stopped for whatever reason. Variations are contemplated that utilize a single conveyor as are ovens making use of three or more conveyors.

The outer shell 110 of the pyrolyzer is shaped like a teardrop as can be best identified in FIGS. 6-9. The outer shell comprises a top half 146 and a bottom half 148. The halves can be fabricated from any suitable high temperature alloy but is typically formed from a similar material as the oven 112. The halves are typically bolted together at adjoining flanges 149. The split shell allows for allow easier installation, repair inspection the oven 112 as required.

Figure 8:
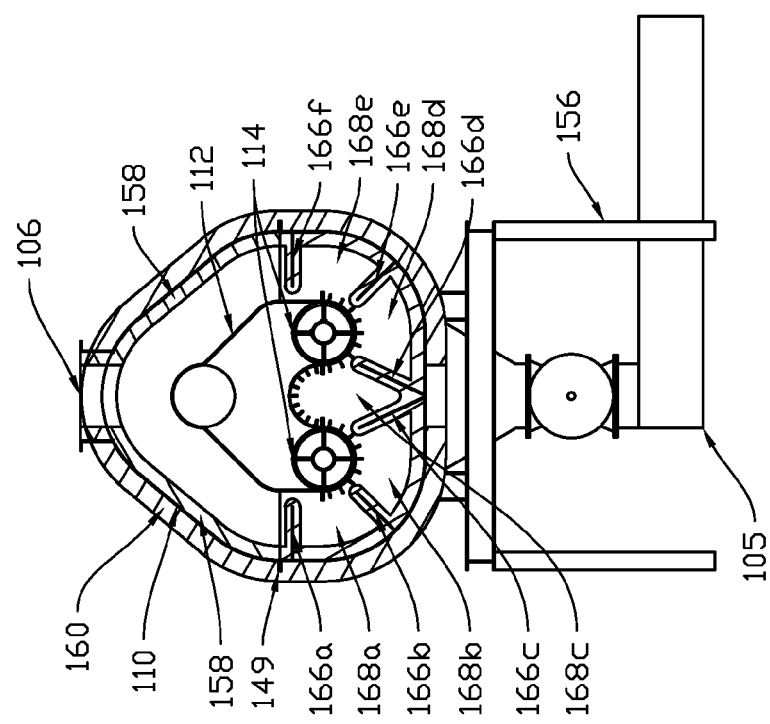
FIG. 8 is a section view of the pyrolyzer taken along lines C-C of FIG. 5 according to an embodiment of the present invention.
Figure 10:
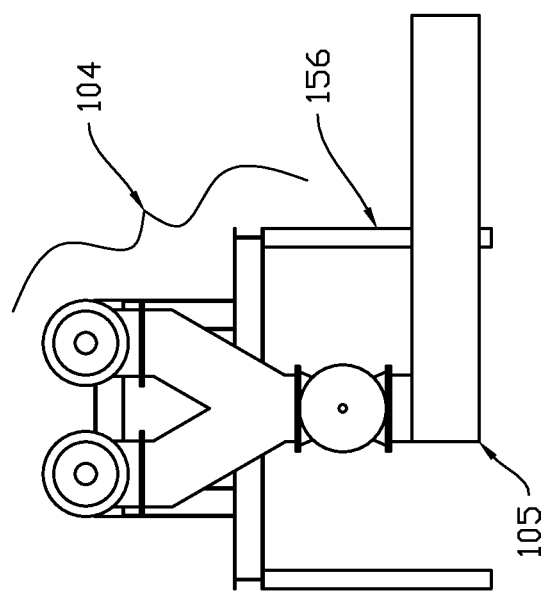
FIG. 10 is a section view of the pyrolyzer taken along lines E-E of FIG. 5 according to an embodiment of the present invention.
Figure 11:
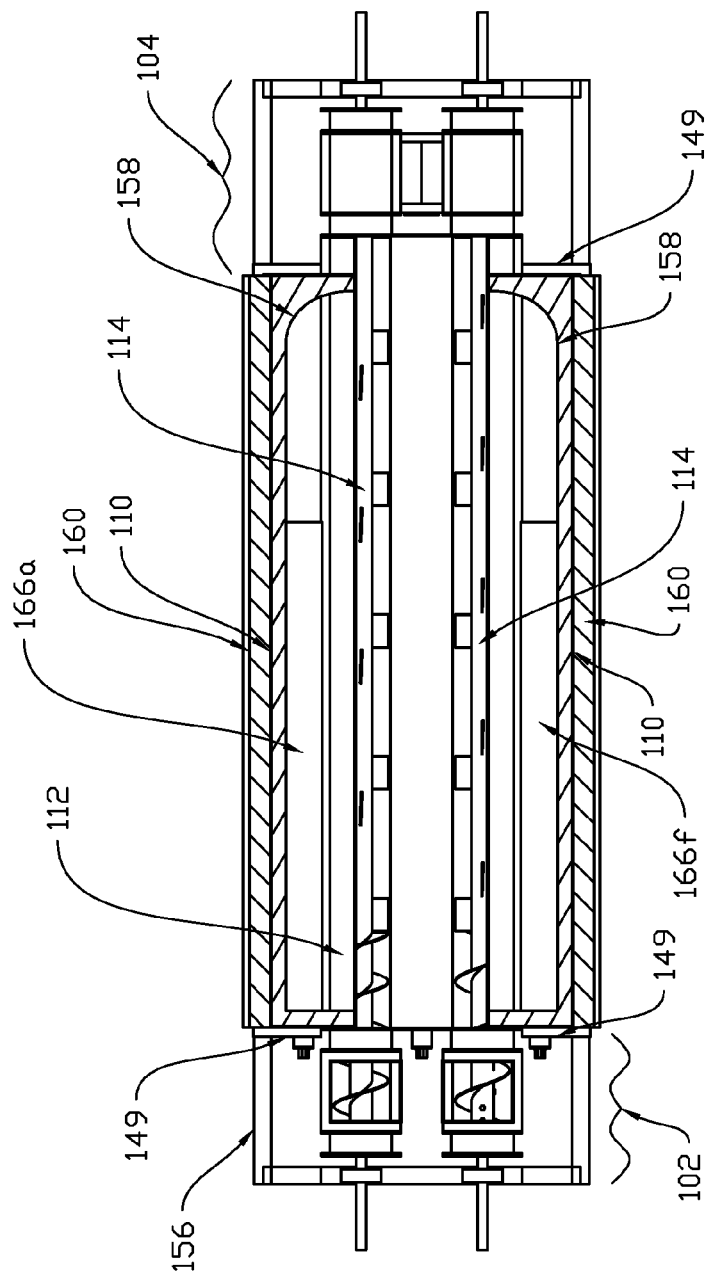
FIG. 11 is a section view of the pyrolyzer taken along lines G-G of FIG. 5 according to an embodiment of the present invention.
Figure 12:
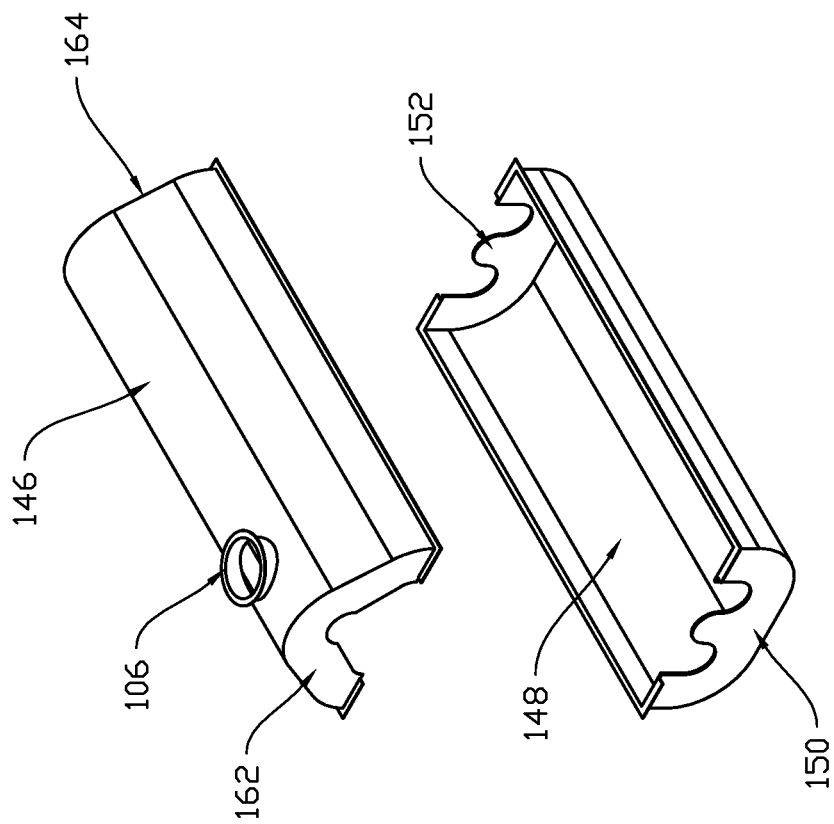
FIG. 12 is an isometric exploded view of the top and bottom sections of the outer shell according to an embodiment of the present invention.
Figure 13:
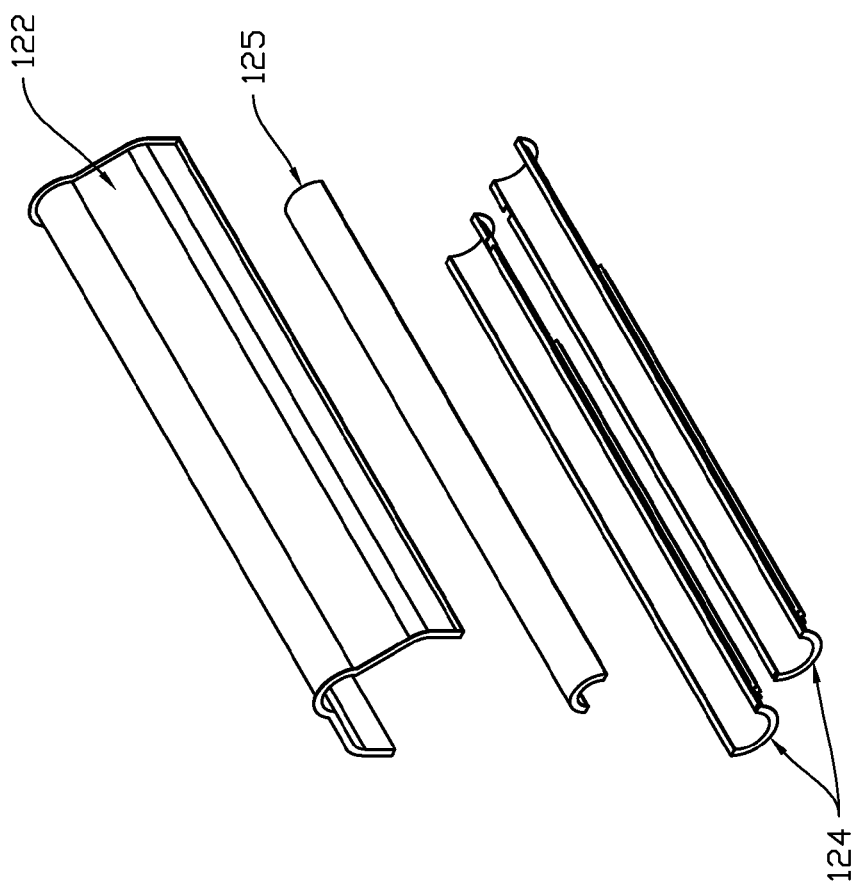
FIG. 13 is an isometric exploded view of the various sections that when assembled comprise the oven according to an embodiment of the present invention.

The interior of the outer shell comprises an inner layer of ceramic based insulation 158 that is typically attached to shell walls using ceramic insulation hangers. The ceramic insulation as shown in FIGS. 8 and 11 can be cast-in-place, brick, or pre-cast. The exterior of the outer shell comprises blanket insulation 160, which acts to maintain the exterior surface of the pyrolyzer to less than 135 degrees F.

The bottom half 148 includes front and back side walls 150 & 152 that forms a saddle configured to receive thereon and support the oven as shown in FIG. 4. The oven is typically fastened to the first saddle but rests on the back saddle and other provided supports to allow the oven to expand and contract independently of the outer shell. The entire pyrolyzer is supported on a stand 156 (see FIG. 1a) on which the bottom half rests. Openings (not shown in FIG. 4) are formed in the front sidewall to receive three of the five burners 154a-e used to heat the pyrolyzer as best shown in FIG. 7. The upper half 146 also includes front and back sidewalls 162 & 164 that are formed to seal around the top half of the oven and mate with the lower half of the out shell. The upper half also includes the waste heat removal port 106.

An air space is formed between the exterior of the oven 112 and the interior surfaces of the outer shell 110. It is within this air space that the various burners 154a-e are fired and heated air/exhaust is circulated to heat the oven and its contents. Operationally, intake air is drawn through the burners wherein the oxygen facilitates combustion of the burner energy source, typically natural gas, propane or syngas. The remaining superheated air is mixed with exhaust products of the combustion and flows from the front of the pyrolyzer towards the rear where it is directed upwardly and then back towards the front of the pyrolyzer to be exhausted out of the waste heat removal port 106.

Divider walls 166a-f are provided that extend longitudinally approximately two thirds to three quarters of the length of the outer shell 110 and span from the inner surface of the outer shell to exterior surface of the oven 112 as best seen in FIGS. 8 & 11. Some of the dividers, such as at least the bottommost dividers 166c & d also act to support the oven within the outer shell. As best shown in FIG. 8, the walls define multiple temperature control zones 168a-e (or heating sectors) that each have at least one burner 154a-e associated with them. Since each burner is independently controllable, the multiple temperature control zones permit the oven temperature to be more finely regulated than with prior art pyrolyzers. For instance, the region of the oven proximate one conveyor cradle can be heated to a temperature different from the other conveyor cradle region if desired. Alternatively, if the temperature in one conveyor region is less than desired but the temperature in the other conveyor region is within a desired range, the output of the burners in the temperature control zones proximate the lower temperature conveyor region in the oven can be increased.

As indicated above the divider walls continue for about three fourths the length of the oven before terminating near the back of the oven wherein the heated air and exhaust from the various zones intermingle and flow over the top of the oven before exiting the pyrolyzer through the waste heat removal port.

Figure 18:
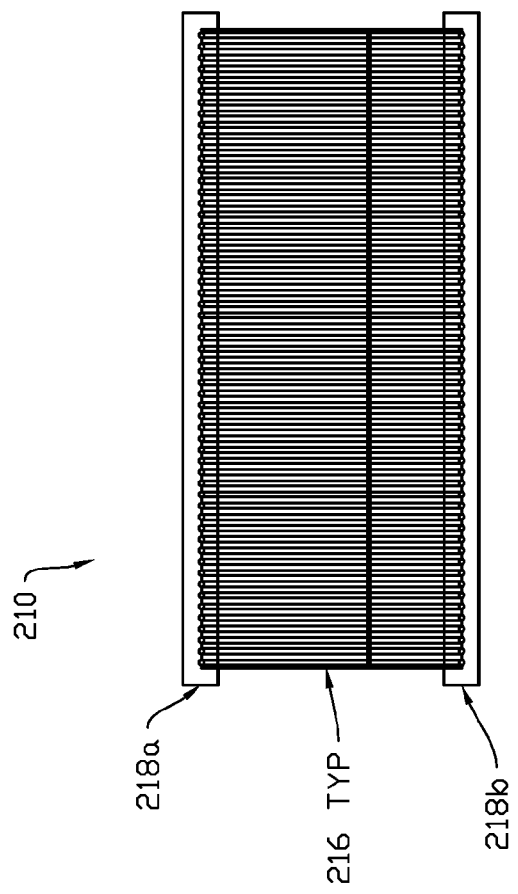
FIG. 18 is a cross sectional view of the outer metal shell of the FIG. 17 embodiment of the pyrolyzer taken along lines I-I of FIG. 7.
Figure 17:
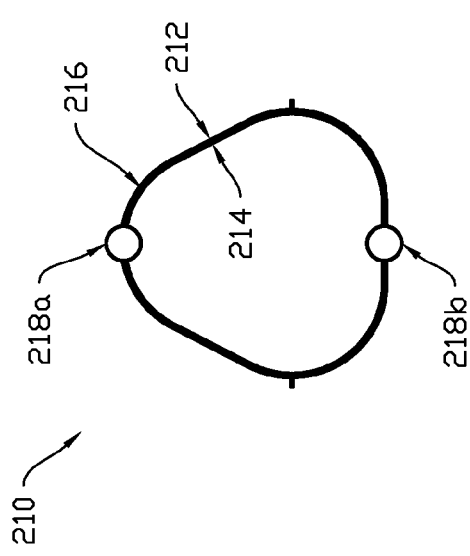
FIG. 17 is a cross sectional view of the outer metal shell of another embodiment of the pyrolyzer taken along lines F-F of FIG. 5.

FIGS. 17 and 18 illustrate another outer shell 210 suitable for use in another embodiment of the pyrolyzer wherein the metal shell 110 is replaced with two spaced apart walls 212 & 214 sandwiching a plurality of tubes 216 that operationally extend between upper and lower tubular drums 218 a&b. The drums are typically located at the top and bottom of the shell with on drum configured for receiving water from an external source and the other opposite drum configured to facilitate piping the water away from the pyrolyzer. Lower temperature water is heated as it passes through the tubes allowing the recovery of heat that would otherwise be lost to the atmosphere. In one application, condensed water is received from the steam boiler system where it is pre-heated before being sent to the boiler where it is transformed into to steam.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A pyrolyzer capable of generating synthesis gas from carbon-based feedstock, the pyrolyzer comprising:
   an oven including:
      an oven shell defining an interior;
      at least one feed inlet into the interior located at a front end of the oven shell;
      at least one feedstock discharge outlet from the interior located at a rear end of the oven shell;
      a synthesis gas discharge port;
      at least one conveyor configured to move the feedstock from the feed inlet to the discharge outlet through the interior;
   an outer shell surrounding the oven shell and defining a space between the oven shell and the outer shell;
   a plurality of heaters directed into the space proximate the front end of the oven shell, each heater of the plurality being independently controllable;
   a plurality of dividers connected to the outer shell and spanning to the oven shell within the space and extending longitudinally from the front end proximate the heaters, the plurality of dividers defining multiple temperature control zones wherein each temperature control zone includes one or more heaters of the plurality of heaters.

2. The pyrolyzer of claim 1, wherein the oven shell is fabricated from a high temperature alloys.

3. The pyrolyzer of claim 2, wherein the high temperature alloys include one or both of Haynes HR-160 and Haynes 230.

4. The pyrolyzer of claim 1, wherein the oven shell is fabricated from two or more distinct sections that are one or both of welded or mechanically joined together.

5. The pyrolyzer of claim 4, wherein the at least one conveyor comprises a rotary conveyor.

6. The pyrolyzer of claim 5, wherein the two or more sections forming the oven shell comprises at least: an upper half section including the synthesis gas discharge port for pulling syngas from the interior and a lower section including a cradle for receiving the feedstock and the rotary conveyor.

7. The pyrolyzer of claim 4, wherein the at least one conveyor includes left and right rotary conveyors, and the two or more sections forming the oven shell comprise: (i) an upper half section including the synthesis gas discharge port for pulling synthesis gas from the interior; (ii) a left cradle section for receiving feedstock and the left rotary conveyor therein; (iii) a right cradle section for receiving feedstock and the right rotary conveyor therein; and (iv) a elongated arcuate section spanning between the left and right cradle sections.

8. The pyrolyzer of claim 7, wherein outer downwardly facing surfaces of the left and right cradle sections and the elongated arcuate section each include a plurality of heat transfer ribs attached thereto to facilitate the transfer of heat into the interior of the oven shell.

9. The pyrolyzer of claim 8, wherein the plurality of heat transfer ribs comprise Haynes 230 alloy and portions of the oven shell contacting the interior comprise Haynes HR-160 alloy.

10. The pyrolyzer of claim 1, wherein the at least one conveyor comprises more than one conveyor.

11. The pyrolyzer of claim 1, wherein the at least one conveyor comprises a rotary conveyor.

12. The pyrolyzer of claim 11, wherein the rotary conveyor comprises at least three sections: (i) an intake section located proximate the feed inlet comprising a first helical fin; (ii) a discharge section located proximate the discharge outlet comprising a second helical fin; and (iii) a center decomposition section disposed between the intake and discharge sections, the decomposition section comprising a plurality of distinct fins.

13. The pryrolyzer of claim 12, wherein the plurality of distinct fins are orientated at a shallow acute angle relative to a longitudinal axis of the rotary conveyor.

14. The pyrolyzer of claim 1, further comprising an airlock feeder assembly located at the feed inlet and an airlock discharge assembly located at the discharge outlet.

15. The pyrolyzer of claim 1, wherein the outer shell comprises top and bottom halves.

16. The pyrolyzer of claim 15, wherein the top half includes a waste heat exhaust removal port located proximate a front end of the to half of the outer shell.

17. The pyrolyzer of claim 1, wherein the outer shell is comprised of a high temperature alloy.

18. The pyrolyzer of claim 17, wherein the high temperature alloy comprises Haynes 230 alloy.

19. The pyrolyzer of claim 1, wherein one or more of the plurality of dividers form supporting dividers for the oven shell within the outer shell.

20. The pyrolyzer of claim 19 wherein the outer shell comprises to and bottom halves, the bottom half of the outer shell includes front and back sides including saddles configured to receive the ends of the oven shell thereon, the oven shell is mechanically secured to the bottom half of the outer shell at the front side saddle but only rests on the back side saddle and the one or more supporting dividers permitting the oven shell to expand and contract freely relative to the outer shell.

21. The pyrolyzer of claim 1, wherein a length of each of the plurality of dividers is about ¾ the length of the outer shell.

22. The pyrolyzer of claim 21, wherein the plurality of dividers comprise six dividers creating 5 temperature control zones.

23. The pyrolyzer of claim 22, wherein each temperature control zone is heated by at least one heater of the plurality of heaters.

24. The pyrolyzer of claim 23, wherein each heater of the plurality of heaters comprises a burner.

25. The pyrolyzer of claim 1, wherein the plurality of dividers comprise six dividers creating 5 temperature control zones.

26. The pyrolyzer of claim 25, wherein each temperature control zone is heated by at least one heater of the plurality of heaters.

27. The pyrolyzer of claim 26, wherein each heater of the plurality of heaters comprises a burner.

28. The pyrolyzer of claim 1, wherein each heater of the plurality of heaters comprises a burner.

29. The pyrolyzer of claim 1, wherein each of the plurality of heaters and associated temperature control zones are located generally beneath the oven shell.

30. The pyrolyzer of claim 1, wherein the outer shell includes a layer of insulation.

31. A method of operating the pyrolyzer of claim 14 comprising:

loading feedstock into the pyrolyzer through the airlock feeder assembly into the interior of the oven shell, the airlock feeder assembly preventing the free flow of oxygen into the interior;

modulating the plurality of heaters in each temperature control zone to maintain the temperature of the oven shell proximate the at least one rotary conveyor at 1400-1900 degrees F.;

advancing the feedstock from the front end of the oven shell to the rear end of the oven shell by rotating the at least one rotary conveyor;

drawing synthesis gas as it is produced out of the interior of the oven shell through the synthesis gas discharge port; and discharging ash and char remaining from pyrolysis of the feedstock out of the interior of the oven shell through the airlock discharge assembly.

32. The method of claim 31, further comprising, directing air heated by the heaters (i) along the temperature control zones defined in the space between the oven shell and the outer shell from the front end of the oven shell to the rear end thereof, (ii) upwardly around the oven shell within a space proximate the rear end of the oven shell, and (iii) forwardly within a space from the rear end of the oven shell to a waste heat exhaust removal port located in the outer shell near the front end of the oven shell.

33. A method of repairing the oven shell of claim 6, comprising:
removing the oven shell from within the outer shell; removing a damaged or worn section; replacing the worn section with a new section; and affixing the new section to other sections of the oven shell through mechanical fastening or welding.

34. A method of repairing the oven shell of claim 7, comprising: removing the oven shell from within the outer shell; removing a damaged or worn section; replacing the worn section with a new section; and affixing the new section to other sections of the oven shell through mechanical fastening or welding.

* * * * *